Jan. 12, 1932.  E. S. WELTY  1,841,263
DEVICE FOR TRANSMITTING POWER AT A VARIABLE RATIO
Filed Feb. 15, 1930  3 Sheets-Sheet 3
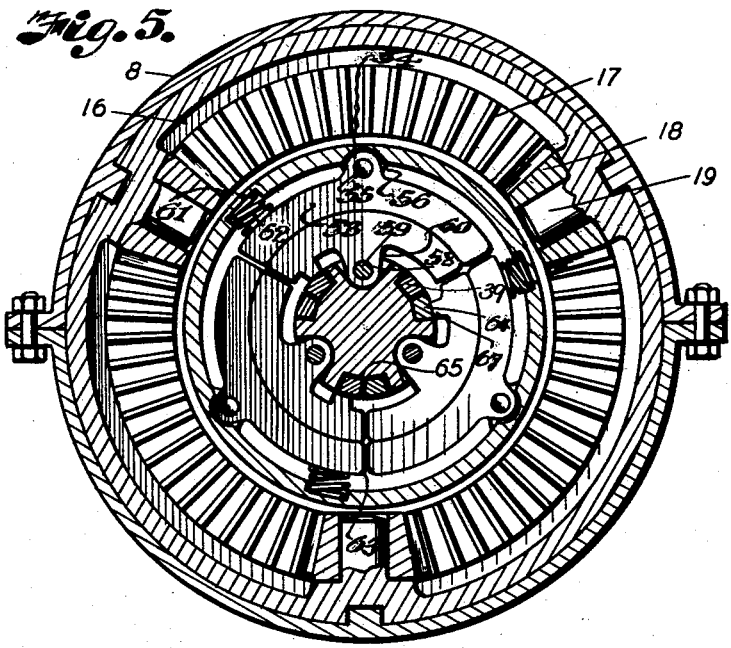
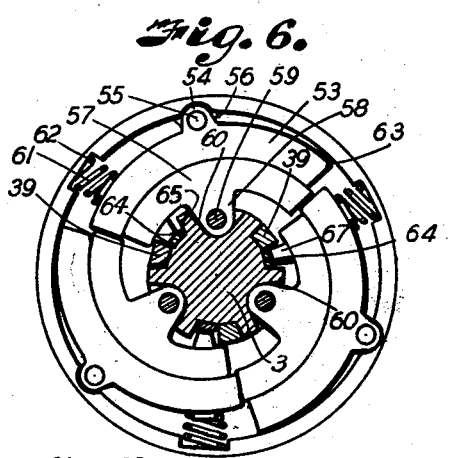
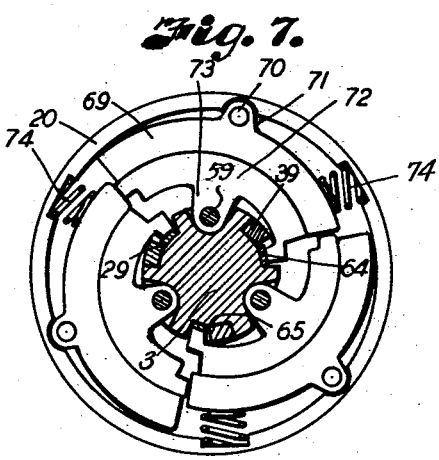
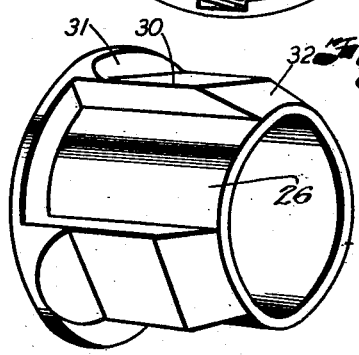
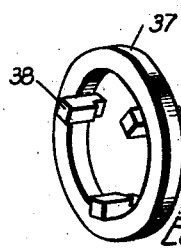
INVENTOR
Edgar Shirley Welty
BY
Arthur C. Brown
ATTORNEY Patented Jan. 12, 1932

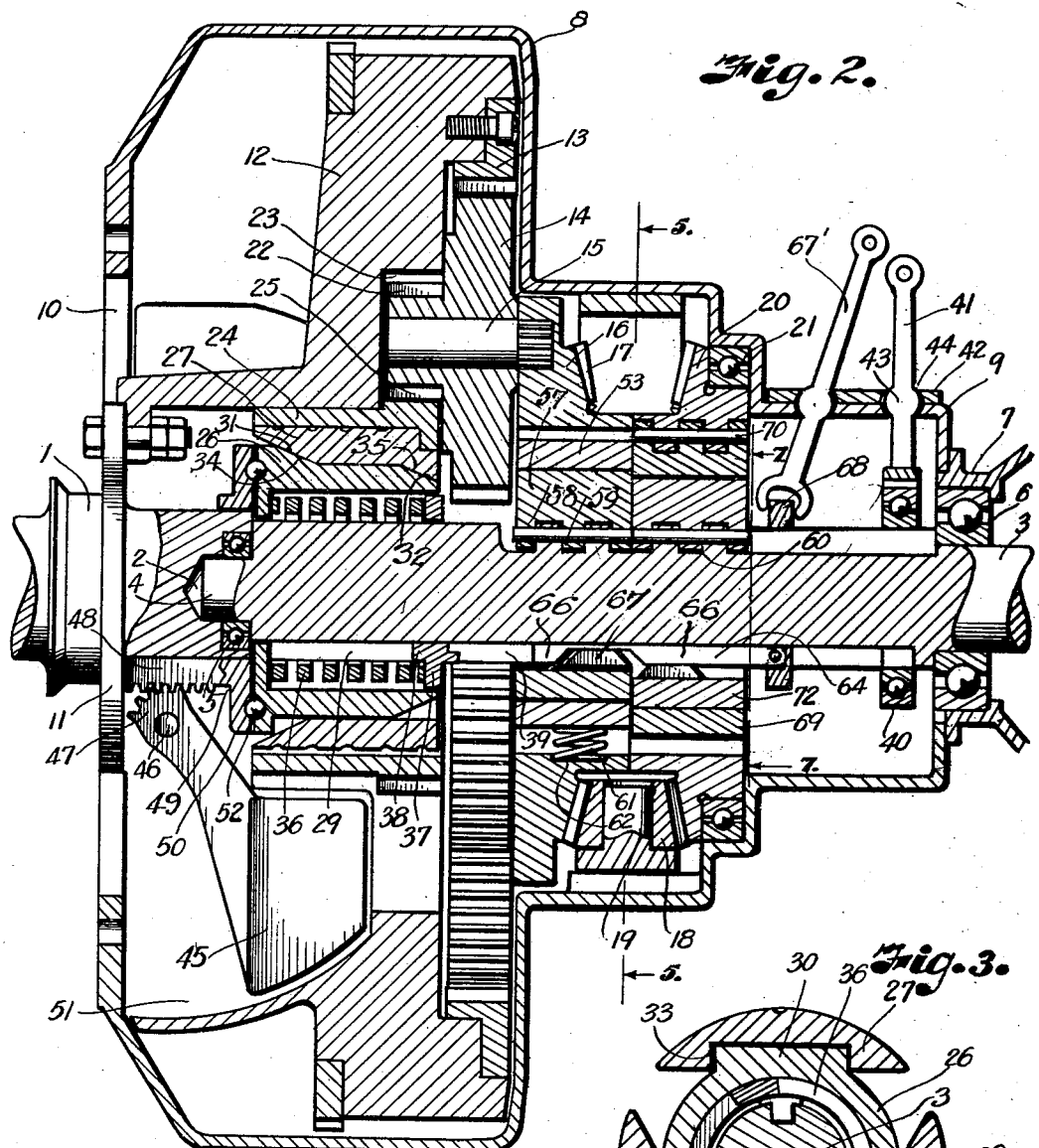

1,841,263

UNITED STATES PATENT OFFICE

EDGAR SHIRLEY WELTY, OF KANSAS CITY, MISSOURI; ELIZABETH S. WELTY, GUARDIAN OF SAID EDGAR SHIRLEY WELTY, MINOR, ASSIGNOR OF ONE-HALF TO WILLIAM F. CRAMER, OF KANSAS CITY, MISSOURI

DEVICE FOR TRANSMITTING POWER AT A VARIABLE RATIO

Application filed February 15, 1930. Serial No. 428,630.

My invention relates to power transmission devices and more particularly to transmissions including gear shifting means such as the transmission of an automotive vehicle.

Automobile and like machines usually include a driving shaft actuated by an engine, a driven shaft adapted to operate the wheels of the automobile and a plurality of sets of gears which may be independently connected to the driving shaft for effecting movement of the driven shaft at speeds having definite ratio to the speed of the driving shaft. The engine is ordinarily allowed to speed up when the vehicle is started, and a gear having a relatively low ratio with respect to the speed of the driving shaft is operated so that initial movement of the vehicle will be at relatively low speed and stalling of the engine will be prevented.

When the vehicle has been put into movement higher speed gears may be connected by operating other clutches. Should an abnormal load be put on the driven shaft and tend to check the speed of movement of the driving shaft, for example when the vehicle is moving upwardly on a grade, the operator must ordinarily change gears to prevent stalling of the engine, and contrarily when the vehicle is moving under the influence of gravity down a grade, gears must be manually operated to control the speed of the vehicle.

It is further well known that a throttle valve leading from the carburetor to the engine of an automobile is operable by the driver of the machine independently of the clutches, and the driver therefore may accelerate the speed of the engine greatly beyond safe conditions for applying a gear clutch and may inadvertently operate one or another clutch when the speed of the engine and driving shaft are not suitably adjusted to the ratio of the gear thus connected.

It is further well known that means for braking the wheels or driven shaft of an automobile are operable independently of clutches and transmission gears and of accelerator operating mechanism, whereas both the accelerator and the braking means may more safely and efficiently be operated only when the transmission is in a condition to permit such operation.

The principal objects of my invention therefore, are to effect variation in the ratio of the speed of a driven shaft and a driving shaft in accordance with most effective driving relation between the shafts to automatically bring about clutching relation between a driving shaft and a driven shaft when the driving shaft has attained pre-determined speed, to facilitate adjustment of the speed ratio at which driving connection will be set up between the driving shaft and the driven shaft, to provide a transmission between a driving shaft, and a driven shaft adapted to permit the driving shaft to operate at normal speed when sufficient resistance is offered to the driven shaft, and to effect automatic adjustment of the ratio of speed between a driving shaft and a driven shaft corresponding to changes in resistance exerted against the driven shaft.

In accomplishing these and other objects of the invention, I have provided improved details of structure, the preferred forms of which are illustrated in the accompanying drawings, wherein:

Fig. 2 is a vertical longitudinal central section through the transmission.

Fig. 3 is a cross-section of friction clutch members mounted on the driven shaft for controlling planetary movement of planetary gears.

Fig. 4 is a detail perspective view of racks operable by weighted governors for operating the friction clutch mechanism.

Fig. 5 is a section on the line 5—5, Fig. 2.

Fig. 6 is a similar section illustrating clutching mechanism in position for a forward operation of the power shaft.

Fig. 7 is a section on the line 7—7 Fig. 2, illustrating clutch mechanism for effecting reverse operation of the power shaft.

Fig. 8 is a perspective view of a sleeve member of the friction clutch mechanism slidable on the driven shaft.

Fig. 9 is a detail perspective view of a collar slidably keyed on the driven shaft for anchoring a spring whereby the sliding clutch member is returned to non-operative position.

Figure 1:
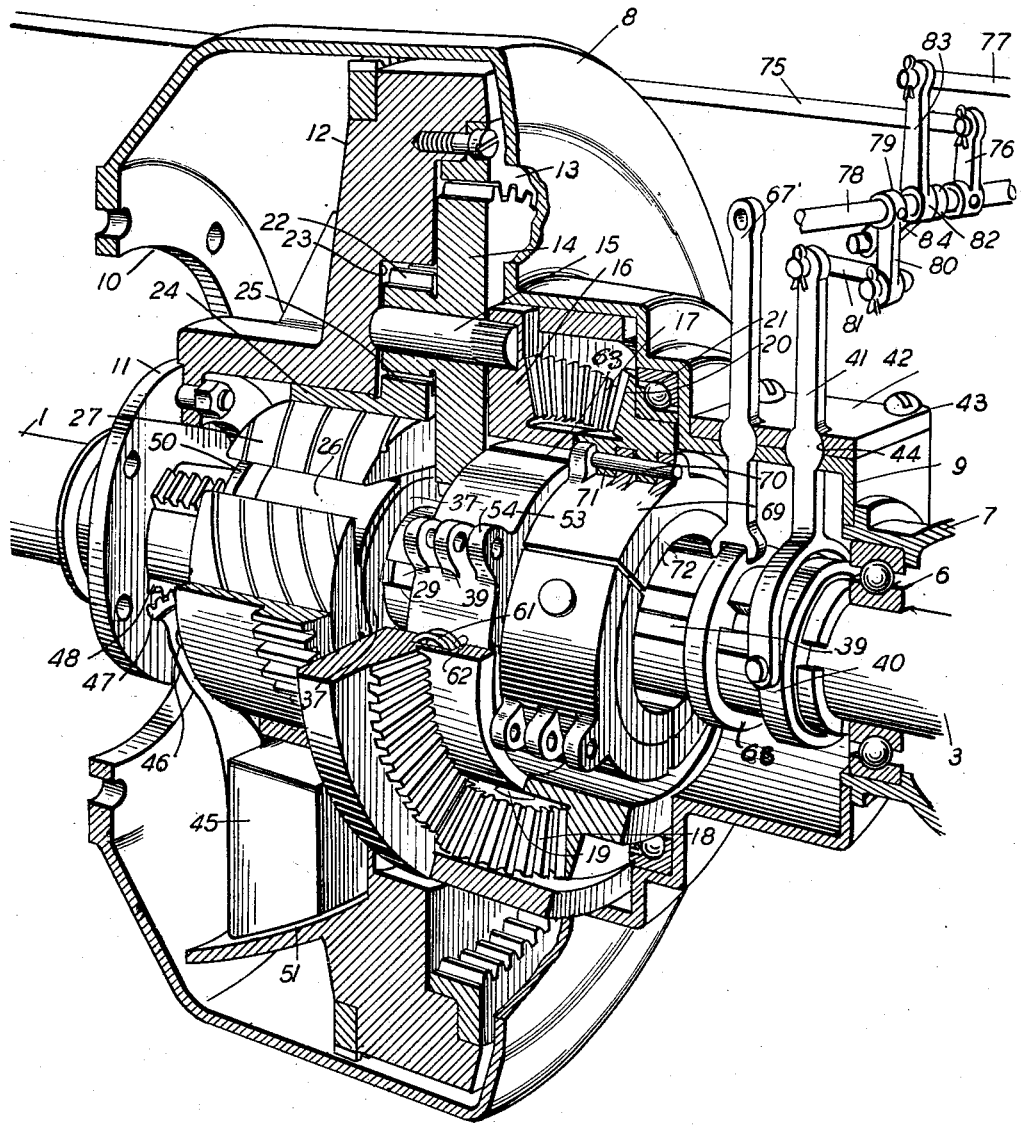
Fig. 1 is a perspective view partly in section of a transmission constructed in accordance with my invention, driving and driven shafts and an accelerator operating rod being shown fragmentarily.

Referring in detail to the drawings:

1 designates a driving shaft supported in a suitable manner and adapted to be operated by an engine or the like, and having an end recess 2, and 3 a driven shaft having a reduced end 4 in said recess, bearings 5 being mounted in the driving shaft to retain the shafts rotatably in true alignment. The outer end of the driven shaft is shown journaled in bearings 6 mounted in a supporting structure 7.

A housing or gear case 8 surrounding the driven shaft has an internal radial flange 9 secured to the supporting member 7, and an opening 10 in its opposite end to admit the driving shaft to the driven shaft, and is shaped conformably to transmission elements and operating members presently described for containing and supporting the same.

Fixed to a radial flange 11 on the driving shaft at the opening 10 is a fly wheel 12 provided with an internal ring or orbit gear 13 meshed with planet gears 14 comprising a set of planetary gears rotatable on stub shafts 15 fixed in a ring 16 surrounding the driven shaft and having an inner periphery spaced from the driven shaft to accommodate gear engaging members presently described.

Formed on the outer face of the ring 16, used to effect forward operation of the driven shaft as later described, are inclined radial teeth 17 forming a beveled ring gear adapted to mesh with radial bevel pinions 18 rotatably mounted on posts 19 fixed to a ring keyed to the housing, and a similar bevel ring gear 20 rotatable in bearings 21 in the housing also engages the pinions 18 whereby reverse operation of the driven shaft may be effected. When the planetary gears are conditioned for planetary movement about the shaft, the ring 16 will drive the driven shaft forwardly or reversely at the same speed as the movement of the planetary gears.

To control the planetary gears and render them effective for rotating and regulating the speed of the driven shaft, smaller planet gears 22 comprising a secondary set of planetary gears are fixed concentrically to the planet gears 14 to operate in a recess 23 in the fly wheel, and a ring 24 rotating freely over the inner periphery of the fly wheel has a series of radial teeth 25 adjacent one edge projecting into the recess 23 and forming a sun gear constantly meshed with the small planet gears 22 and adapted to be frictionally clutched to the driven shaft by clutch members 26 and 27 as presently described.

The clutch member 26 illustrated in Fig. 8 comprises a sleeve having internal lugs 28 slidable in longitudinal grooves 29 in the driven shaft whereby the sleeve is keyed to the shaft, and external longitudinal ribs 30 provided with cam faces 31 and 32 at opposite ends of the sleeve, while the clutch members 27 comprise shoes having longitudinal internal grooves 33 for mounting the same on the ribs, the bottoms of the grooves having cam faces 34 and 35 at opposite ends of the shoe conforming to the cam faces on the ribs.

The sleeve is spaced from the driven shaft to accommodate a spring 36 bearing against the lugs to urge the sleeve away from clutch enforcing position and anchored by a collar 37 at the opposite end of the sleeve having lugs 38 sliding in the shaft grooves. The collar is retained in spring anchoring position by a plurality of rods 39 shown as three in number, located in the grooves 29 and having reduced ends latched in notches in the collar to enable the collar to hold the rods in the grooves, and extending toward the outer end of the shaft. A rod shifting collar 40 mounted on the driven shaft and bearing against the outer ends of the rods is operable by a lever 41 extending upwardly through a housing wall portion 42, and having rounded bosses 43 located in sockets 44 in said wall portion, whereby the lever may be pivoted to move the rods and vary the tension of the spring.

The sleeve 26 is movable against the tension of the spring to move the cam faces thereof over the cam faces of the shoes for expanding the circle in which the shoes lie and engaging the same with the free ring 24, by governors 45 swingingly mounted on pivots 46 fixed to the inner face of the fly wheel hub and having segmental racks 47 engaging racks 48 on a ring 49 slidable on the driving shaft and having a radial end flange or collar 50 adapted to bear against the end of the sleeve when the governors swing about the driving shaft and oscillate on their pivotal supports 46 responsively to rotation of the fly wheel.

The governors are substantially weighted and adapted to swing in recesses 51 formed in the fly wheel while bearings 52 are interposed between the collar 50 of the ring 49 and the end of the sleeve to permit the collar to rotate freely over the end of the sleeve, the collar and sleeve end being formed to provide recesses to accommodate the bearings. The spring therefore retains the sleeve in engagement with the collar to retain the bearings and shift the collar for returning the governors to retracted position in the recesses.

The means above referred to for rendering the ring 16 effective for bringing about forward movement of the driven shaft, that is to say, rotation of the driven shaft in a direction to effect forward movement of a vehicle, comprises a clutching or ratchet mechanism, segmental shoes 53 having centrally located radial apertured lugs 54 pivotally mounted on pins 55 in internal ears 56 on the ring 16 and adapted for end to end abutment as clearly shown in Fig. 5, and similar smaller segmental shoes 57 seated in the first named shoes having centrally located apertured lugs 58 mounted on pivot pins 59 located in notches 60 in the driven shaft. The radial end faces of the shoes on the two sets register, and the shoes are spaced sufficiently respectively from the ring and the shaft to permit rocking movement on the pivot pins. Springs 61 anchored in recesses 62 in the ring 16 bear against similar ends of the outer shoes and tend to move said ends inwardly toward the shaft. The ends of the shoes of both sets have beveled corners as indicated at 63, to prevent contact of sharp corners of one set of shoes with corners of shoes of the other set when the sets rotate relatively to each other.

The shoes are retained in circular position, whereby the ring-engaged shoes may rotate over the shaft-supported shoes, by rods 64 slidable in longitudinal grooves 65 in the driven shaft and having humps or bosses 66 adapted to engage lugs 67 on the shoes 57 so that when the bosses lie under the lugs, the shoes will be latched against the tension of the springs. The rods are reciprocable by a lever 67' similar to the lever 41, engaging a collar 68 pivotally connected to the outer ends of said rods. When the bosses are shifted away from the lugs, the springs may operate to rock the shoes, and the ends of the inner shoes will abut against the ends of the outer shoes to lock the shaft to the ring 16, and effect forward movement of the driven shaft.

A reverse clutch ratchet mechanism includes similar sets of outer shoes 69 pivotally mounted on pins 70 supported by internal ears 71 of the ring 20, and inner shoes 72 are mounted on the pins 59 in the shaft and provided with internal lugs 73 engageable by aforesaid bosses 66 on the rods 64 for rocking the shoes to retain the shoes in circular position or restore them to such position, springs 74 similar to the springs 61 being provided to rock the sets of shoes and effect engagement therebetween for locking the ring 20 to the driven shaft.

The ring 16 constantly meshed with the bevel pinions 18 rotates the same in one direction, to effect rotation of the ring 20 in the opposite direction, so that when the ring 20 is clutched to the driven shaft, said shaft is rotated reversely.

I further provide for effecting cooperation between the means above described for controlling the operation and speed of the driven shaft, and other controlling elements of a machine, as an example, the structure of an automobile including a reciprocating accelerator rod 75 for operating the throttle whereby delivery of fuel to the engine of the automobile is controlled for regulating the application of actuating power to the automobile, a crank arm 76 pivoted to said rod for shifting the same, and a brake rod 77 rotatable to apply brakes to the wheels of the automobile.

A shaft 78 keyed in the end of the crank 76 and rotatable to operate the rod 75 is keyed in a bearing 79 on the end of a crank 80 pivotally connected by a link 81 to the end of the lever 41, whereby rotative movement of the shaft 78, for example by a pedal, will coincidently move the accelerator rod to alter the rate of delivery of fuel and operate the lever to vary the tension of the spring 36.

The shaft rod 75 and lever are so connected that tension of the spring will be increased when delivery of fuel is increased, and vice versa.

Loosely mounted on the shaft 78 is a sleeve 82 having an arm 83 pivotally connected to the brake rod and an arm 84 extending angularly to the arm 83 and adapted to encounter the crank 80 when the brake is operated to move the lever 41 for increasing tension on the spring 36, whereby the spring will be tensioned to limit or suspend operation of the clutching sleeve 26 when the brake is applied to suspend operation of a machine operated by the engine, and tension of the spring may not be relieved while the brake is set.

In operating mechanism constructed as described, the engineer, or driver of a vehicle provided with the mechanism, will operate the lever 67' to initially set up engagement of one or the other of the rings 16 or 20 with the driven shaft, and operate the lever 41 to put a desired amount of tension on the spring 36. The engine having been put into operation for rotating the driving shaft 1, the rotating fly wheel and internal gear thereon meshed with the planetary gears, will cause the gears to rotate on their individual axes, namely the shafts supported by the ring 16, said ring remaining unmoved.

The rotation of the driving shaft and fly wheel will cause the governors to swing on their pivots and tend to press the ring 49 against the sleeve to shift the sleeve along the driven shaft against the resistance of the spring 36 for urging the shoes 27 outwardly against the ring 24, and effecting gradual frictional clutch engagement between the ring 24 and the sleeve.

The resistance offered by the spring 36 to operation of the frictional clutch by the governors, is controlled through rods 39 and lever 41, whereby variation in the tension of the spring may effect variation in the ratios of force and speed between the driving and driven shaft.

Free rotation of the ring 24 between the fly wheel and the driven shaft is thus prevented, and the planetary gears, meshed with the fly wheel gear, are thus caused to move in a planetary path about the driven shaft to rotate the ring 16.

The ring 16 will always rotate in the same direction as the fly wheel and driving shaft, and when engaged with the driven shaft through the forward clutch mechanism including the shoes 53 will rotate the driven shaft in the same direction as the driving shaft. The inner sun gear 24, however, initially rotates in the opposite direction to the driving and driven shafts.

As clutch action increases, the ring 24 is first slowed to rest, then gradually increases rotation in the direction of the fly wheel until the clutch is locked, when the ring 24, the planetary gears and ring 16 will all be rotating with the driving shaft. The driven shaft having been locked with the ring 16 is now rotating at the same speed as the driving shaft.

For reverse motion, lever 67 is pushed in the opposite direction, thus reciprocating the rods to disengage the ring 16 from the driven shaft and operating the reverse clutch ratchet mechanism to engage the ring 20 with the driven shaft.

The ring 16, rotated through the planetary gears, the motion of which is controlled as above described, rotates the pinions 18 to rotate the ring 20, and the driven shaft is thus rotated reversely at a speed equal to the speed of planetary movement of the planetary gears. The sun gear, however, is not reversed as above described, for forward movement, but slows until it reverses in the same direction and with the driven shaft.

It is apparent that the ratio of movements of the driving shaft and driven shaft will be in accordance with the comparative pitch diameters of the gears 14 and 22, and the ratio between the movement of the sun gear and either of the shafts 1 and 2.

What I claim and desire to secure by Letters Patent is:

1. In apparatus of the character described, including a driving shaft, a driven shaft, a planetary gear unit including a planet gear meshed with the driving shaft, and means for connecting said unit to the driven shaft, a sun gear rotative on the driven shaft in mesh with said planet gear, a friction clutch on the driven shaft engageable with said sun gear, and means responsive to speed of rotation of the driving shaft controlling the clutch for controlling the planetary gear unit.

2. In apparatus of the character described including a driving shaft, a driven shaft, and a planetary gear unit including a planet gear rotated by the driving shaft, means for connecting said unit with the driven shaft, a sun gear in operating relation with said planet gear, and resilient adjustable means including friction clutch members related respectively to the driven shaft and the sun gear controlling the sun gear for controlling the planetary gear unit.

3. In combination with a driving shaft, a driven shaft, a planetary gear unit connected with the driving shaft, and means for effecting driving relation between said unit and the driven shaft, means responsive to speed of movement of the driving shaft for rendering the planetary gear unit effective to drive the driven shaft, and resilient means movable relative to the driven shaft for varying the response of said means to the movement of the driving shaft.

4. In combination with a driving shaft, a driven shaft, and a planetary gear unit including a planet gear rotated by the driving shaft and a gear engageable with the driven shaft, means including a spring pressed frictional clutch and a governor responsive to speed of movement of the driving shaft and operative on the clutch for rendering the planetary gear unit effective to drive the driven shaft.

5. In apparatus of the character described, including a driving shaft, a driven shaft, a planetary gear unit including a gear constantly rotated by the driving shaft, a planet gear support engageable with the driven shaft, and a planet gear on said support meshed with the first named gear, means for effecting driving relation between the planetary gear unit and the driven shaft, and means for supplying power to the driving shaft, means responsive to the speed of the driving shaft for controlling the operation of said first named means, and common means controlling said shaft responsive means and power supplying means.

6. In apparatus including a driving shaft, a driven shaft, and means for supplying power to the driving shaft, a planetary gear unit including a gear constantly rotated by the driving shaft, a planet gear meshed with the first named gear, and a planet gear support engageable with the driven shaft, means for effecting driving relation between the planetary gear unit and the driven shaft, means responsive to the speed of the driving shaft for controlling the operation of said second named means, and means coincidently controlling said first and third named means.

7. In combination with a driving shaft having a fly wheel provided with an orbit gear, a driven shaft, and a planetary gear unit including a planet gear constantly meshed with the orbit gear, means for effecting driving relation between the planetary gear unit and the driven shaft to drive said shaft, and means mounted on the fly wheel and responsive to the speed of the driving shaft for rendering the planetary gear unit effective to rotate the driven shaft.

8. In combination with a driving shaft having a fly wheel provided with an internal orbit gear, a driven shaft, a planetary gear unit including a planet gear constantly meshed with the orbit gear, and means for effecting driving relation between the planetary gear unit and the driven shaft, a sun gear ring constantly meshed with the planetary gear unit, a shoe adapted to engage the inner periphery of the ring, and means including a clutch keyed to the driven shaft for pressing the shoe against the ring for rendering the planetary gear unit effective to rotate the driven shaft.

9. In combination with a driving shaft having a fly wheel provided with an orbit gear, a driven shaft, a planetary gear unit including a planet gear constantly meshed with the orbit gear, and means for effecting driving relation between the planetary gear unit and the driven shaft, a second planet gear fixed to the first named planet gear, a sun gear ring constantly meshed with said second named planet gear, and means responsive to speed of the driving shaft controlling said ring for rendering the planetary gear unit effective to rotate the driven shaft.

10. Apparatus of the character described including a driving shaft having a fly wheel provided with an orbit gear, a driven shaft, a planet gear constantly meshed with the orbit gear, and means for operatively connecting the planet gear with the driven shaft, a second planet gear having smaller pitch diameter than the first named planet gear and keyed thereto, a sun gear ring constantly meshed with the second named planet gear, a clutch engageable with said sun gear, and means responsive to the speed of the driving shaft for operating the clutch to render the planetary gear unit effective to rotate the driven shaft.

11. In apparatus of the character described including a driving shaft, a driven shaft, an orbit gear on the driving shaft, a planetary gear unit including a planet gear meshed with said orbit gear, and means for engaging said unit with the driven shaft, a second planet pinion keyed to said planet gear, a ring surrounding the driven shaft and having peripheral teeth forming a sun gear engaging said pinion, a clutch member slidable on the driven shaft and keyed thereto against rotation thereon, a shoe interposed between the clutch and said ring and adapted to be moved radially by the clutch into frictional engagement with the ring to latch the ring slidably to the driven shaft, a spring normally urging said clutch away from said shoe, means responsive to the speed of the driving shaft operating against said spring to effect sliding clutch relation between the ring and the driven shaft and means for varying the tension of the spring to vary the extent of frictional clutch engagement between the ring and the driven shaft.

12. In apparatus of the character described including a driving shaft, a driven shaft, and a brake rod, a planetary gear unit including a planet gear connected to the driven shaft, an orbit gear meshed with said planet gear and keyed to the driving shaft, a ring constantly engaged with the planet gear, means including a member responsive to the speed of the driving shaft and engageable with said ring for rendering the orbit gear and planetary gear unit effective for rotating the driven shaft, and means operated by said brake rod for controlling operation of said means.

13. In a device of the character described including a driving shaft, a driven shaft, and a planetary unit having means for transmitting motion of the driving shaft to the driven shaft, a governor having pivotal mounting on the driving shaft, a clutch including a member keyed to the driven shaft, and means controlled by the governor for operating the clutch to render the planetary unit effective for transmitting motion to the driven shaft.

14. In a device of the character described including a driving shaft, and a member for controlling delivery of power to the driving shaft, a driven shaft, a planetary gear unit including a planet gear, a gear driven by the driving shaft engaged with the planet gear, and means for connecting the planetary gear unit with the driven shaft, means for rendering the planetary gear unit effective to drive the driven shaft, and means controlled by said member for controlling said first named means.

15. In combination with a driving shaft, a driven shaft, and a planetary gear unit including a planet gear rotated by the driving shaft, means including a member on the driven shaft and a member on the driving shaft responsive to speed of movement of the driving shaft to operate the first named member for rendering the planetary gear unit effective to drive the driven shaft, and manually operable means for controlling the operation of said first named member by said speed responsive member.

16. In apparatus of the character described, a driving shaft, a driven shaft, a planetary gear unit connected with the driving shaft, means for connecting said unit with the driven shaft, a sun gear on the driven shaft in operating relation with said planetary gear unit, clutch mechanism including a member slidable on the driven shaft and a member engageable with the sun gear, and a member movable on the driving shaft to operate the clutch for controlling the planetary gear unit.

17. In a device of the character described including driving and driven members and a planetary gear unit having means for transmitting motion of the driving member to the driven member, a gear in operating relation with said planetary gear unit, clutch means for setting up driving relation between said gear and the driven member, means responsive to the speed of the driving member for operating the clutch, and manually operable means acting against said clutch operating means for resisting the operation of said clutch operating means.

In testimony whereof I affix my signature.

EDGAR SHIRLEY WELTY.